Dec. 31, 1957 S. CZESNOCHA 2,817,921
FISHING LURES
Filed April 1, 1954

INVENTOR.
Stanley Czesnocha
BY Hoppe, Leonard & Buell
his Attorneys

United States Patent Office 2,817,921
Patented Dec. 31, 1957

2,817,921

FISHING LURES

Stanley Czesnocha, McKees Rocks, Pa.

Application April 1, 1954, Serial No. 420,379

5 Claims. (Cl. 43—42.18)

This invention relates to fishing lures and particularly to a new and novel fishing lure and hook attachment. One of the great problems in fishing lures has been to provide a lure which is substantially weedless and in which the hooks can be readily interchanged or replaced. Many and varied types of lures have heretofore been proposed as well as many types of hook attaching means. None of these, however, has been completely successful for one or more reasons. Virtually every lure heretofore proposed has been complicated by the need for fixed hooks or hooks which are very difficultly removable. The present invention provides a fish lure which overcomes all of these problems.

In a preferred embodiment of this invention I provide a front weed deflector portion, an elongated body portion flexibly connected to the weed deflector portion and bent intermediate its length and a spring latch means at the end opposite the weed deflector adapted to detachably engage a hook. Preferably the elongated body portion is elliptical in shape and is bent at an oblique angle to the plane of the body. The spring latch means is preferably provided with a shoulder portion which passes through an opening in the end of the elongated body portion opposite its connection with the weed deflector means. The shoulder is preferably adapted to bear on the body portion surrounding the opening when pull is exerted on the latch. A tongue portion on the latch preferably extends obliquely away from the plane of the body portion and is bent forward toward the body portion to form a hook which is removably engaged in a clasp on the surface of the body portion.

Figure 1:
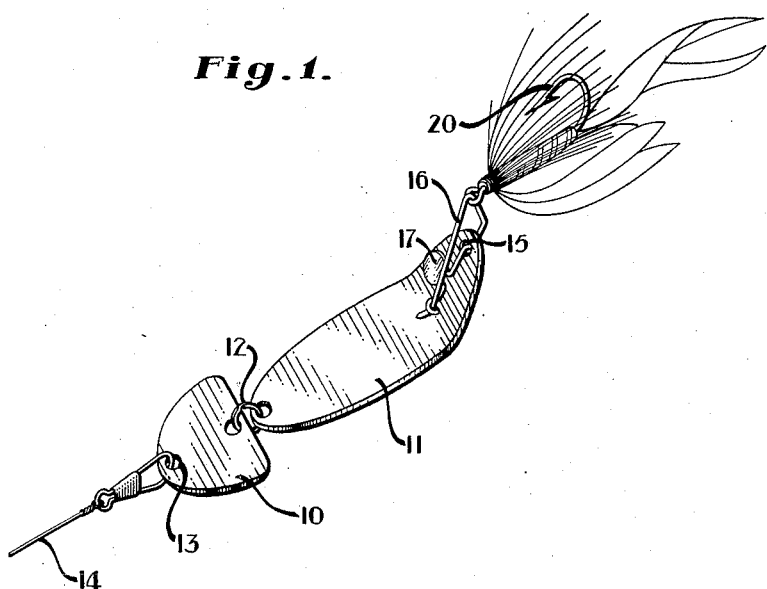
Figure 2:
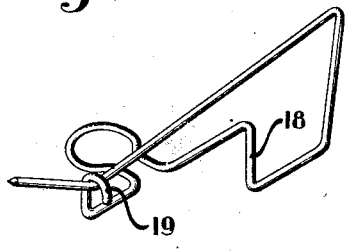

While I have disclosed certain salient features of the invention other features, objects and advantages will become apparent from a consideration of the following description and the accompanying drawings in which Figure 1 is an isometric view of a fish lure according to this invention; and Figure 2 is an enlarged view of the spring latch shown in Figure 1.

Referring to the drawings, I have shown a weed deflector portion 10 connected to an elliptical elongated body portion 11 by a flexible connector 12. The flexible connector may be in the form of a split ring arrangement commonly associated with key rings. The deflector portion 10 is provided with an opening 13 to which a leader 14 or the line may be connected. The body portion 11 is bent intermediate the end preferably adjacent the end remote from the weed deflector at an angle which is oblique to the plane of the main body portion. An opening 15 is provided at the end of the body portion remote from the weed deflector. A spring latch or clip 16 is attached to the body portion by means of a rivet 17 or other suitable fastener. The clip is made of spring stock and is formed with a shoulder portion 18 which passes through the opening 15 and is thereafter bent upwardly at an oblique angle to the plane of the body and then back upon itself towards the body portion where it is removably engaged by a clasp 19 formed in the fixed end of the clip. The particular form of the latch or clip shown in the drawings prevents the clip from being removed from the body portion by a pull on the hook 20 which is removably fastened to the clip. A pull on the hook 20 causes the shoulder portion 18 to bear against the body portion surrounding the opening 15. At the same time it causes the spring clip to tend to flatten out parallel to the body portion and the end engaged in the clasp to bear against the body of the lure to prevent removal from the clasp and give added strength to the clip.

The arrangement of the weed deflector portion, the elongated body portion and the spring latch means is such that the lure is substantially weedless and has a highly attractive flexible movement in the water. Moreover, the hook can be changed without loss of time and without danger of personal injury.

Although I preferably use the lure in the form described above the weed deflector portion 10 can be reversed or removed along with the split ring 12 and the line or leader 14 connected directly to the elongated body portion 11. Even in this form the lure is exceptionally weedless.

Preferably the end of the tongue extending beyond the clasp 19 is sharpened so that pork rind or similar bait may be attached at one end onto the clip and onto the hook fastened on the clip.

The particular arrangement of the invention is highly desirable for use with artificial flies (as illustrated) or any of a variety of well-known artificial and natural bait and hook combinations. The ease of hook change makes it possible to reduce the number of lures carried by making it possible to build up a large number of combinations out of fewer components than has heretofore been possible.

While I have illustrated and described a preferred embodiment of my invention it will be understood that it may be otherwise embodied within the scope of the following claims.

I claim:

1. A fishing lure comprising a front weed deflector portion, an elongated elliptical body portion flexibly connected to the weed deflector portion, said elongated body portion being bent intermediate its length, said body portion having an opening therein at the end opposite its connection with the weed deflector means, and latch means fixed to the body and passing through said opening, said latch means having a shoulder adapted to bear on the body portion surrounding the opening when pull is exerted on the latch, a tongue portion on the latch extending transversely away from the plane of the body portion and being bent back upon itself toward the body portion to form a hook and clasp means removably engaging the end of the tongue.

2. A fishing lure as claimed in claim 1 wherein the end of the tongue is sharpened.

3. A spring latch for artificial lures comprising a body portion, a shoulder portion intermediate the body portion adapted to pass through an opening in the lure and bear against the edge thereof, a clasp member on one end thereof, means for attaching said body portion to a lure, and a tongue portion on the end opposite the clasp bent transversely away from the body portion and then back upon itself toward the body portion to form a hook engageable in the clasp means.

4. A fishing lure comprising an elongated body portion bent intermediate its length and a spring latch means fixed at one end thereof passing through an eye in the body portion and adapted to detachably engage a fish hook eye whereby pull exerted on the hook is transmitted to the eye in the body portion, said spring latch means being fixed to the body portion and having a shoulder adapted to bear on the body portion surrounding the eye when pull is exerted on the latch, a tongue portion extending transversely away from the plane of the body portion and being bent back upon itself toward the body portion to form a hook and clasp means removably engaging the end of the tongue.

5. A fishing lure as claimed in claim 4 wherein the end of the tongue is sharpened.

References Cited in the file of this patent

UNITED STATES PATENTS

| | | |
|---|---|---|
| 805,160 | Sargent | Nov. 21, 1905 |
| 1,231,742 | Hurlbut | July 3, 1917 |
| 1,728,560 | Goshorn | Sept. 17, 1929 |
| 1,950,310 | Jones | Mar. 6, 1934 |
| 2,000,734 | Accetta | May 7, 1935 |
| 2,037,310 | Bryan | Apr. 14, 1936 |
| 2,168,476 | Nartung | Aug. 8, 1939 |
| 2,375,290 | Docteur | May 8, 1945 |
| 2,632,277 | Cogswell, et al. | Mar. 24, 1953 |
| 2,638,698 | Eppinger | May 19, 1953 |

FOREIGN PATENTS

| | | |
|---|---|---|
| 47,728 | Denmark | 1933 |